United States Patent [19]
Alexander

[11] 3,778,088
[45] Dec. 11, 1973

[54] LOAD AND SWAY CONTROL FOR TRAILERS

[76] Inventor: Emmett L. Alexander, 802 S. Hayes, 12 Pembrook Square, Enid, Okla. 73107

[22] Filed: July 26, 1971

[21] Appl. No.: 165,900

[52] U.S. Cl............................................ 280/406 A
[51] Int. Cl............................................. B60d 1/06
[58] Field of Search..................... 280/406 A, 446 B

[56] References Cited
UNITED STATES PATENTS

| | | | |
|---|---|---|---|
| 2,793,879 | 5/1957 | Bair | 280/406 A |
| 2,863,673 | 12/1958 | Lisota | 280/406 A |
| 3,129,957 | 4/1964 | Bernard | 280/406 A |
| 3,347,562 | 10/1967 | Bolyard | 280/40.6 A |
| 3,600,004 | 8/1971 | Newkark | 280/446 A |
| 3,602,529 | 8/1971 | Derr, Jr. | 280/406 A |
| 3,403,928 | 10/1968 | Laughlin | 280/406 A |

Primary Examiner—Leo Friaglia
Assistant Examiner—Randall A. Schrecengost
Attorney—Claude A. Fishburn et al.

[57] ABSTRACT

A load distribution and stabilizer structure for use between a towing vehicle and trailer having a tongue member with a connection or hitch member thereon engageable with a receiving member on a support bar mounted on and extending from the towing vehicle includes a truss member having arms carried below the trailer tongue and linkage members fulcrumed at the pivotal hitch. The truss member has a forward end with sliding braking engagement with a surface fixed relative the support bar and linkage adjustably connecting the rearward ends relative the tongue to apply force or leverage to the truss member to distribute the load on the trailer tongue member between the towing vehicle and the towed vehicle. The linkage and mounting holding the tongue and truss member against relative lateral movement for stabilization.

8 Claims, 9 Drawing Figures

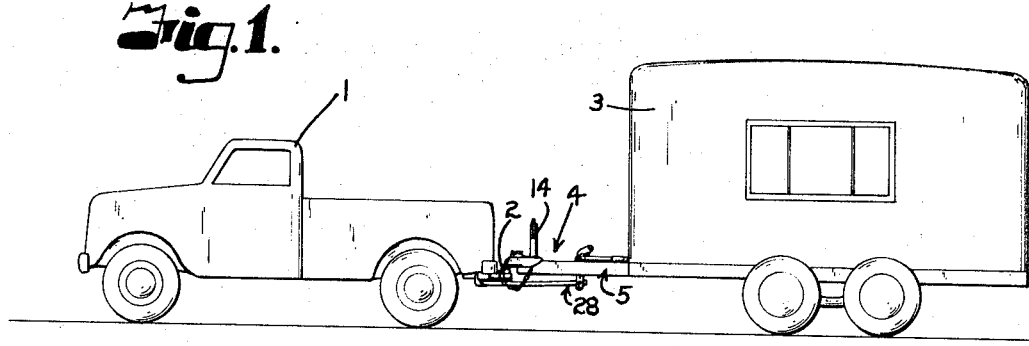
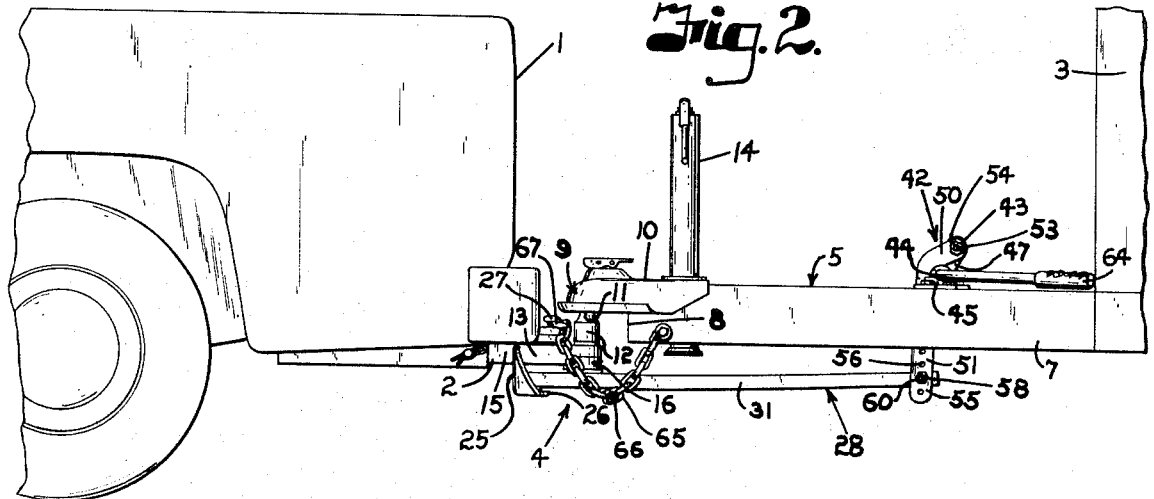
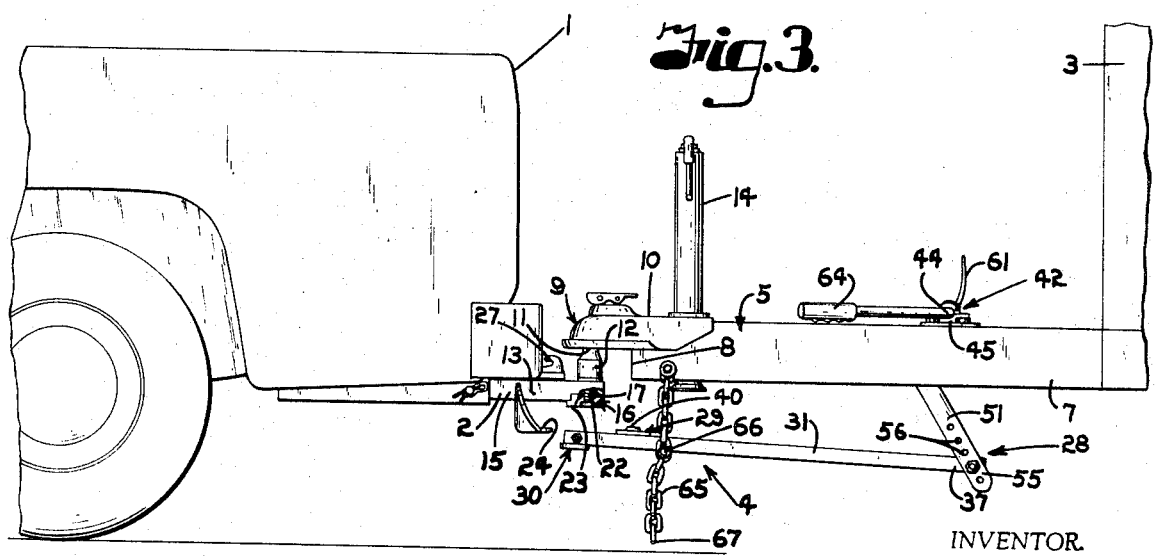

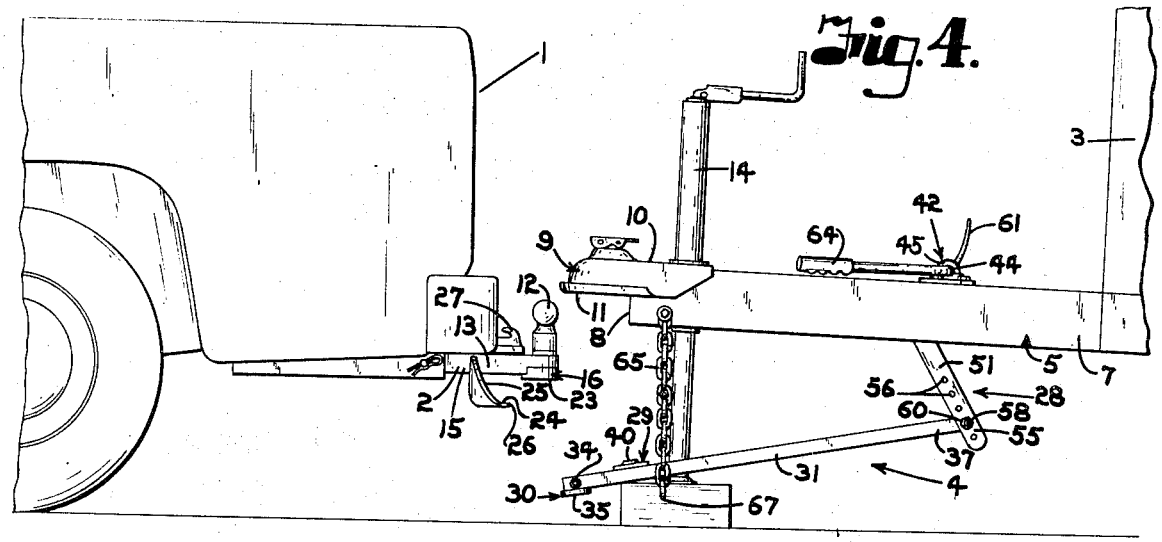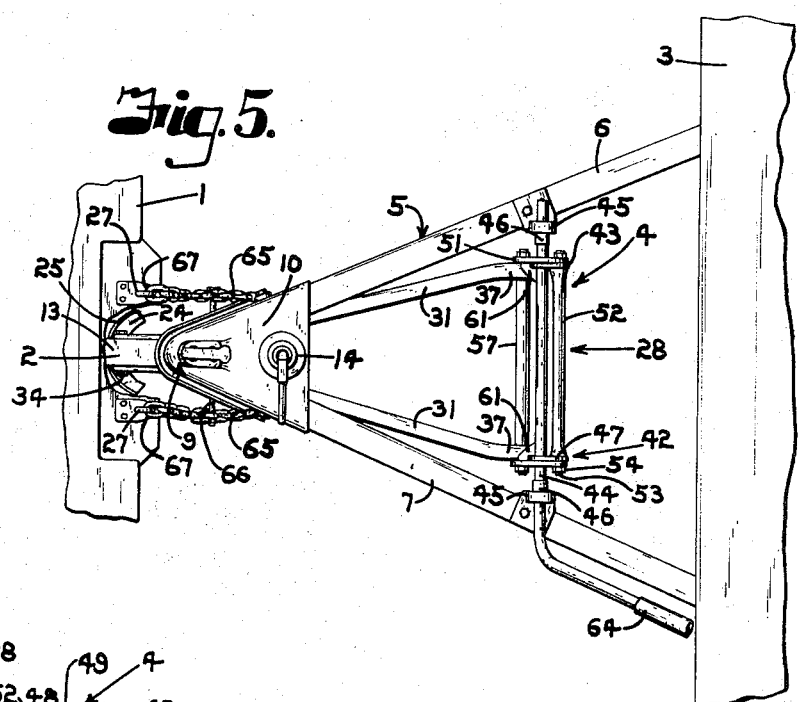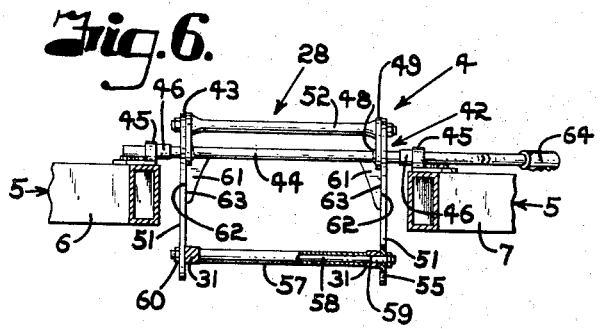

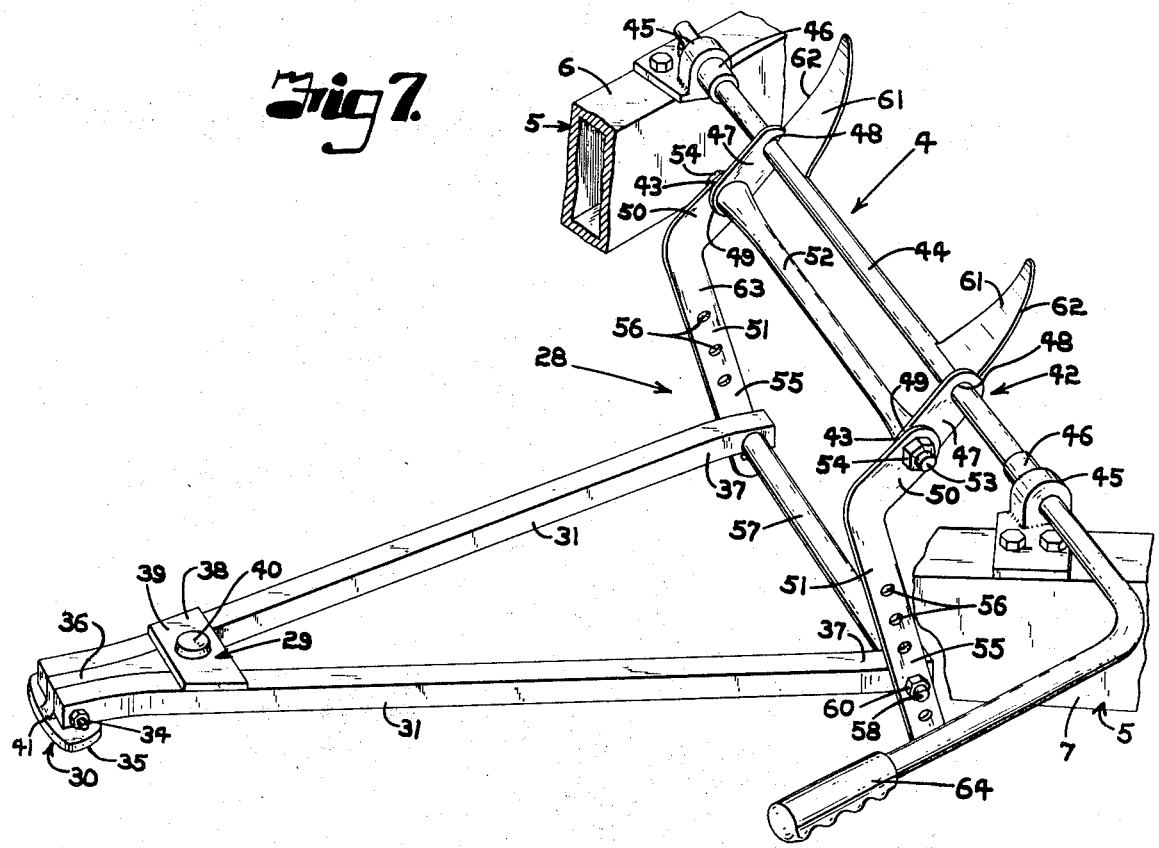
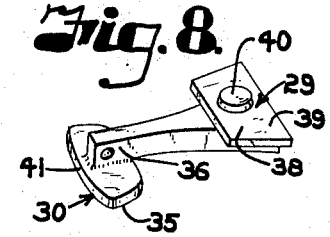
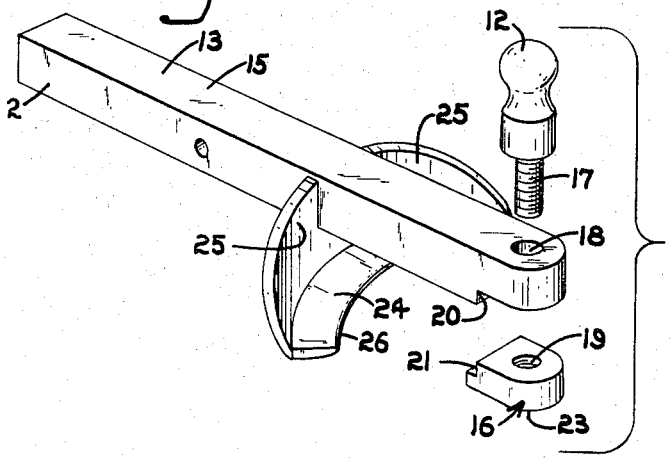
INVENTOR.
Emmett L. Alexander

LOAD AND SWAY CONTROL FOR TRAILERS

The present invention relates to load distribution structures for trailers and more particularly to a load distribution and sway control structure operative to distribute the load between the towing vehicle and the towed vehicle.

The use of trailers for moving and travelling over the country, wherein the trailer member is connected by hitch to a towing vehicle such as a truck, passenger car or the like, has become quite common. Generally, there is a hitch between the vehicles having a universal connection such as a ball mounted on the rear of the towing vehicle which is received and held in a socket member mounted on a tongue or front of the trailer whereby the rear of the towing vehicle supports the front load of the trailer. This can cause excessive load on the rear and also lift or reduce the load on the front of the towing vehicle. Also as the connected vehicles move over rough and winding road the trailing vehicle tends to sway. This can also be caused by sidewind or by fast downhill travel. Such swaying and also the unequal loading creates a dangerous situation or hazard for the driver of the towing vehicle and could even result in jackknifing of the vehicles. Heretofore there have been attempts to eliminate the sway. There have also been other structures attempting to provide load equalizing, but such structures have been complicated, expensive or difficult to install with no co-action between the different corrective devices.

The principal objects of the present invention are: tp provide a load and sway control structure for use between a towed vehicle and a towing vehicle which is operative to distribute the load between the towing vehicle and the towed vehicle; to provide such a structure which is easily connected and disconnected between the towing vehicle and the towed vehicle; to provide such a structure having all working and movable parts thereof carried on the trailer tonque member of the towed vehicle and which has no removable parts requiring storage when not in use; to provide such a structure which is adapted to be connected and disconnected from one side and preferably from the driver's side of the towing vehicle thereby eliminating the necessity for trips from side to side of the respective vehicle; to provide such a structure which is substantially rigid when in the connected position thereby providing positive yaw control to substantially prevent side sway and resistance to loads in all yaw directions; to provide such a structure employing friction for sway control wherein the structure has a frame member having spring bars to absorb and deflect under conditions tending to cause sway or roll between the respective vehicles, to provide such a structure permitting relative turning movements between the towed and towing vehicles while providing positive resistance to jackknifing; to provide such a load structure which is particularly simple to operate; and to provide such a load and sway control structure which is economical to manufacture, positive in operation, neat and clean in appearance, and particularly well adapted for the proposed use.

Other objects and advantages of this invention will become apparent from the following description taken in connection with the accompanying drawings wherein are set forth by way of illustration and example, certain embodiments of this invention.

The drawings constitute a part of this specification and include an exemplary embodiment illustrating various objects and features of the load distribution structure of the present invention.

FIG. 1 is a side elevational view of a towed and towing vehicle provided with the load and sway control of the present invention.

FIG. 2 is an enlarged side elevational view of the trailer and towing vehicle hitch connection with the load and sway control in travelling position.

FIG. 3 is an enlarged side elevational view of the hitch connection and load and sway control in disconnected position.

FIG. 4 is an enlarged side elevational view of the hitch connection in a raised position for connecting the load and sway control.

FIG. 5 is a plan view of the hitch connection and the load and sway control.

FIG. 6 is a transverse sectional view through the trailer tongue and linkage of the load and sway control.

FIG. 7 is a perspective view of the truss and linkage of the load and sway control.

FIG. 8 is a perspective view of the brake plate and fulcrum member.

FIG. 9 is a perspective view of the hitch bar with the fulcrum and ball in disassembled relation.

Referring more in detail to the drawings:

As required, detailed embodiments of the present invention are disclosed herein, however, it is to be understood that the disclosed embodiments are merely exemplary of the invention. Therefore, specific structural and functional details disclosed herein are to be interpreted as merely as a basis for the claims actually defining the scope of this invention. In this regard, it is to be recognized that load and sway control structures, in accordance herewith, may be embodied in various forms, and that various connections may be provided between the towing vehicle and the towed vehicle. However, the disclosure hereof is presented only as a representative basis for teaching one skilled in the art to variously employ the present invention in virtually any appropriate detailed structure.

The reference numeral 1 generally designates a towing vehicle connected by hitch 2 to a towed vehicle or trailer 3. The structure of the present invention is adaptable to any suitable combination of towed and towing vehicles and in the illustrated structure the towing vehicle 1 is a pick-up truck and the towed vehicle is a house trailer or camper with the usual connection at the hitch. The front of the trailer applies a downward load on the truck. With some trailers weighing in the nature of 4,500 pounds, the downward load applied at the front may be in the nature of 700 pounds, which would result in increasing the load on the rear axle of the truck by approximately 1,000 pounds and decreasing the weight on the front axle of the truck in the nature of 300 pounds. Such distribution of weight increases the hazard both from the unequal loading and from increased reaction or sway caused by winds, winding roads and the like. The present invention provides a truss structure and brake generally designated 4 to equalize the loading and reduce sway. In the above example of loading with the equalizer and sway control the front of the trailer is supported and the load distributed as by an increased weight of 110 pounds on the truck front axle, 290 pounds on the truck rear axle and an increase of 300 pounds on the trailer rear axles.

In the structure illustrated the trailer 3 has a tongue 5 which may be of any suitable form, as for example a conventional tongue having converging structural shapes such as channels 6 and 7 connected at their forward ends 8. Fixed on the forward ends of the tongue 5 is a conventional female hitch member 9 having a plate portion 10 secured to the channel 6 and 7 and extending forwardly of the end 8 and provided with a downwardly facing socket 11 engageable with the usual ball 12 on the hitch portion 13 of the towing vehicle 1. It is preferred that the hitch plate 10 or the tongue 5 have suitably mounted thereon a jack 14 that is in the form of an extensible member with a portion to engage the ground or the like and raise and lower the tongue of the trailer during connecting and disconnecting of the hitch. The female hitch member 9 may also have a latch structure to hold the ball in the socket during travel. The hitch member and socket on the tongue and the hitch member of the towing vehicle as above described may be any conventional structure and the apparatus of the present invention may be applied thereto or portions thereof may be modified to provide integral structure for economy of manufacture.

In the structure illustrated the towing vehicle is provided with a rigid structure which includes a support bar 15 extending rearwardly therefrom and having the ball 13 secured thereto, said ball defining a vertical axis for the pivot between the truck and trailer. The bar 15 also has a fulcrum member 16 projecting downwardly therefrom below the ball 13 and in the structure illustrated the ball 13 has a threaded shank 17 extending downwardly therefrom through a bore 18 in the bar 15 and is threaded into a threaded bore 19 of the fulcrum member. The bar 15 also has a reduced thickness at the end portion that provides a shoulder 20 engaged by a face 21 on the fulcrum member so when assembled the fulcrum member 16 is rigidly secured to the bar and held against rotation. The fulcrum member has a downwardly opening recess 22 co-axial with the ball 13, said recess being surrounded by surface 23 for a purpose later described. The bar 15 also has a structure rigidly secured thereto to provide an upwardly facing brake surface 24 arranged in an arcuate shape co-axial with the axis of the ball 13 and spaced below the surface 23 of the fulcrum member as later described. The brake surface 24 is a part of a member that is preferably rigid with the bar 15 and in the illustrated structure consists of a generally upright wall 25 extending outwardly in both directions from the bar 15 and curving in an arc having a radius from the axis of the ball 13. The wall 25 terminates in a rearwardly extending flange 26 that has the surface 24 as the upward face thereof to serve as a brake as later described. The hitch mounting of the truck also has laterally spaced hooks 27 to receive safety chains from the trailer tongue as in conventional practice.

A truss structure generally designated 28 is mounted on the trailer tongue 5 and has a fulcrum portion 29 engaging the fulcrum member 16 on the bar 15 and a brake member 30 slideably engaging the surface 24 with heavy spring arms 31 extending rearwardly toward the trailer forming long levers, the rear portions of which is connected to structure on the trailer tongue or trailer to apply an upward force on the levers to equalize the load. In the structure illustrated, the truss structure has two lever arms of heavy spring material connected at their forward ends 33 by a suitable fastening device 34. In the structure illustrated, the brake member 30 is a form of a plate having the bottom brake surface 35 adapted to engage the brake surface 24 of the tow bar 15. The plate 30 has upwardly extending rib or spacer member 36 located between the forward ends 33 of the arms 31 to space said ends and the fastening means 34 secures the spacer member rigidly to the arms. The arms 31 extend rearwardly and diverge outwardly to space the rear end portions 37. The spacer member 36 extends between the arms and supports a plate 38 that extends laterally and is supported on and secured to the arms 31. The plate is a part of the fulcrum portion 29 and has an upper surface 39 adapted to engage the surface 23 of the fulcrum member 16. The fulcrum portion 29 also includes an upstanding trunion 40 of a size to be received in the socket 22 in the fulcrum member 16. To retain the forward portion of the truss structure against lateral motion the trunion 40 is spaced from the end of the arms 31 and plate 30 a suitable distance to provide clearance between the forward edges 41 of the plate 30 and the wall 25 of the hitch bar 15 when in operative position with the trunion 40 positioned in the socket 22.

Adjustable force applying structure 42 is mounted on the tongue 5 and suitably connected to the rear end portions 37 of the truss arms 31 to apply an upward force to said truss arms and also to prevent lateral motion relative to the trailer tongue. It is preferred that this structure have substantially rigid link arms and the like to provide the strength and rigidity and also to provide a simple lock to hold the structure in travelling position and yet be easily released for uncoupling of the truck and trailer.

In the structure illustrated, a toggle linkage 43 connects the truss arms to a shaft 44 mounted on the trailer tongue 5 whereby rotational movement of the shaft will swing the toggle linkage 43 from release to lock position. The shaft 44 extends transversely of the tongue 5 and is rotatably mounted in bearing members 45 suitably secured to the channel members 6 and 7 of the tongue 5. The shaft 44 has collars 46 secured thereto and engaging the bearing members 45 to eliminate any movement of the shaft transversely of the trailer tongue 5. Links 47 are arranged in spaced relation on the shaft 44 and each have one end 48 fixed relative thereto for support in a manner to eliminate any lateral movement. The links 47 extend from the shaft 44 and have their opposite ends portions 49 pivotally connected to end portions 50 of L-shaped links 51. In the structure illustrated, a spacer bar 52 extends between the link ends 49 and have shanks 53 extending from the ends thereof to pivotally connect the end portions 49 of the links 47 with the end portions 50 of the links 51, suitable fastening devices 54 being mounted on the shanks to hold the pivotal connections in position and prevent lateral movement of the parts. The other end portions 55 of the L-shaped links 51 have a plurality of apertures 56 spaced therein to provide adjustable connection with the rear end portions of the truss arms 31. In the structure illustrated a spacer 57 is arranged between the end portions 37 of the arms 31 and a shaft 58 extends therethrough, through apertures 59 in the truss arms 31 and through respective aligned apertures 56 in the links 51 with end portions provided with a fastening devices 60 to provide the pivotal connection between the links 51 and the arms 31 and prevent relative lateral movement thereof. To provide further rigidity, the shaft 44 and links 47 have rigid abutment members 61 thereon and extending from the shaft 44 whereby outer edges 62 of said abutment members engage the inner faces 63 of the links 51 when the structure is in locked position. The shaft 44 extends to one side of the trailer tongue 5 and has a handle member 64 affixed thereto for facilitating rotation of the shaft.

The truss structure 28 and toggle linkage 43 are all mounted on the trailer tongue 5 and remains therewith when parked and when in such parked condition the linkage is in release position with the links 47 extending downwardly from the shaft 44 and the links 51 extending downwardly from the links 47 whereby the rear portion 37 of the truss arms 31 are in their lowermost position. The forward ends 33 of the truss arms could swing downwardly and it is preferred to support same. In the structure illustrated the safety chains 65 have one end connected to the trailer arm and extend downwardly therefrom. A cross member 66 connects the chains and provides a sling support for the forward end of the truss arms. This structure is arranged whereby it will not interfere with the function of the safety chain when in travelling position wherein the opposite ends 67 of said chains are connected to the hooks 27 on the truck or the like.

In connecting a towing vehicle 1 and towed vehicle 3, and applying the load and sway control apparatus, the jack 14 is operated to raise the trailer tongue 5 sufficiently whereby the towing vehicle 1 may be backed into position to align the ball 13 with the socket 11 in the member 9. The jack is then operated to lower the trailer tongue 5 to cause the ball 13 to enter the socket 11 of the hitch and apply the weight of the tongue to the ball and hitch structure of the towing vehicle 1. The latch for the hitch is then operated to hold same in connected position. The jack 14 is again operated to raise the tongue 5 sufficiently whereby the truss arms 31 can be swung forwardly with the forward end 33 raised whereby the forward edge 41 of the brake member 30 will pass over the surface 24 of the flange 26 on the tow bar 15 with the fulcrum plate 38 and trunion 40 moving under the fulcrum member 16. When in this position with the trunion 40 aligned with the socket 22, the jack 14 is operated to lower the tongue 5 to cause the trunion 40 to enter the socket 22. It is preferred that the trunion be frustro-conical to facilitate it entering into the socket and this positions and centers the structure. The handle 64 is then grasped and moved to rotate the shaft 44 swinging the links 47 forwardly and upwardly thereby raising the links 51 and the rear ends of the truss arms 31. This motion is continued until the links 47 swing rearwardly over the shaft 44 past a line through the centers of the shaft 58 and shaft 44. This toggle action and the moving of the links past center is permitted by the L-shape of the links 51 so that they are locked in position and will remain there during travelling regardless of shocks. The ease of movement of the linkage is possible because in the partially raised position there is little load acting between the brake surfaces and fulcrum members. The jack 14 is then operated to completely lower the tongue 5 and the lower end of the jack raised sufficiently above the ground to provide suitable clearance for travelling. With this arrangement there is a leverage wherein the force applied by the linkage pulls the rear end of the arms 31 upwardly and with the fulcrum faces 39 and 23 engaged, the surface 35 of the brake plate 30 is forced with substantial pressure against the brake surface 24, which also applies a downward load on the tow bar 15 to equalize the load. Instead of the load being applied to the rear axle of the towing vehicle with lightening of the load on the front axle as in a structure not having the equalizer, the load is distributed whereby there is some additional load on the front axle and additional load on the rear axle of the towing vehicle and also additional load on the axles of the towed vehicle. To effect disconnection of the towing vehicle and towed vehicle, the operations above described for connection are reversed. In each instance the shaft 44 is rotated when the load is substantially removed from the truss arms making it easy to operate same.

When the trailer and towing vehicle are connected as described, the truss arms 31 are slightly curved rearwardly and upwardly due to the load and spring action. These heavy springs tend to resist side sway or tipping that might result from sidewinds, lateral incline and also from curved roads. As the vehicles move along a road and negotiate curves there is a pivoting at the hitch connection on the axis of the ball 13. This causes relative arcuate movement between the brake plate 30 and the brake surface member 26 but the frictional force applied between the brake surfaces snubs the swinging movement and thus prevents swaying or undue swinging of the towed vehicle.

It is to be understood that while I have illustrated and described one form of my invention it is not to be limited to the specific form or arrangement of parts herein described and shown.

What I claim and desire to secure by Letters Patent is:

1. A load and sway control structure between a towed vehicle and a towing vehicle having supporting wheels, and a universal connection between said towed and towing vehicles, said structure comprising:
   a. a tongue on the towed vehicle;
   b. cooperatively engaging means on said tongue and a towing vehicle providing a universal connection therebetween;
   c. a rigid structure on the towing vehicle and having a surface adjacent to and forwardly of the universal connection, said surface being in a plane normal to the axis of the universal connection means on the towing vehicle;
   d. a truss bar structure having one end portion engaging said surface, said truss bar having pivotal engagement with said rigid structure on the towing vehicle at said axis of the universal connection, said truss bar extending rearwardly from the universal connection under said tongue;
   e. means supported relative said tongue and having connection with said rearwardly extending truss bar and operative to apply a force thereto distributing tongue supporting load normally carried by the towing vehicle to the wheels of both vehicles;
   f. said means supported relative the tongue and connected to the truss bar is a shaft rotatably mounted and linkage carried by said shaft, said linkage including:
      1. first link means having one end secured on said shaft and extending therefrom; and
      2. second link means having one end pivotally mounted on said first link means and an other end pivotally mounted on one end of said truss member whereby rotation of said shaft effects relative movement between said truss member and said surfaces on said rigid structure on the towing vehicle.

2. A load and sway control structure as set forth in claim 1 wherein:
   a. said second link means has one portion movable between a locking position and a release position; and
   b. said shaft has abutment means thereon engageable with said second link means when in the locking position holding same against lateral movement.

3. A load and sway control structure between a towed vehicle and a towing vehicle having supporting wheels, and a universal connection between said towed and towing vehicles, said structure comprising:
   a. a tongue on the towed vehicle;
   b. cooperatively engaging means on said tongue and a towing vehicle providing a universal connection therebetween;
   c. a rigid structure on the towing vehicle and having a surface adjacent to and forwardly of the universal connection, said surface being in a plane normal to the axis of the universal connection means on the towing vehicle;
   d. a truss bar structure having one end portion engaging said surface, said truss bar having pivotal engagement with said rigid structure on the towing vehicle at said axis of the universal connection, said truss bar extending rearwardly from the universal connection under said tongue;
   e. means supported relative said tongue and having connection with said rearwardly extending truss bar and operative to apply a force thereto distributing tongue supporting load normally carried by the towing vehicle to the wheels of both vehicles;
   f. said means supported relative the tongue and connected to the truss bar is a shaft rotatably mounted and linkage carried by said shaft;
   g. said truss member comprises a pair of arms spaced apart at rearward ends thereof and converging toward said one end thereof;
   h. said linkage means includes a pair of spaced first links each having one end secured to said shaft and extending therefrom and a pair of spaced second links each having one end pivotally mounted on the other end of respective first links and the other end thereof pivotally mounted on respective arms of said truss member adjacent the rearward ends thereof; and
   i. said second links are each bell cranks having one portion movable between a locking position and a release position.

4. A load and sway control as set forth in claim 3 including: a. means engaging said links when in the locking position and operating to retain said truss member and tongue against relative lateral movement.

5. A load and sway control structure between a towed vehicle and a towing vehicle having supporting wheels, said structure comprising:
   a. a tongue on the towed vehicle, and extending forwardly thereof;
   b. cooperative engaging means on said tongue and a towing vehicle providing a hitch with a universal connection between said vehicles;
   c. a rigid structure on the towing vehicle and having a surface adjacent to and forwardly of said cooperative engaging means;
   d. a truss member having one end portion engaging said surface, said truss bar having pivotal engagement with said rigid structure on the towing vehicle at an axis of said universal connection, said truss bar extending rearwardly from the universal connection and under said tongue;
   e. means supported relative said tongue and having connection with said rearward extension of said truss member and operative to apply a force to said surface and a truss in the rearward extension of the truss member thereby applying a frictional and torsional resistance to any deviation in the alignment of the two vehicles;
   f. means on said tongue and said supported means connected with said rearward extension of said truss member retaining said rearward extension of the truss member against lateral movement relative to said tongue.

6. A load and sway control structure for use between a towed vehicle, said towed vehicle having a trailer tongue member having a connection member thereon, said load distribution structure, comprising:
   a. a support bar mounted on a towing vehicle and having means thereon for receiving and supporting a connection member on the trailer tongue member;
   b. an elongated truss member spaced from the trailer tongue member;
   c. an elongated shaft rotatably supported relative to a trailer tongue member of a towed vehicle;
   d. linkage means connected to and extending between said shaft and one end of said truss member for effecting relative movement therebetween;
   e. fulcrum means on said truss member and said support bar to effect movement of the other end of said truss member toward and away from said support bar in response to adjustment of said linkage means, said fulcrum means including:
      1. a trunion member on one and a trunion receiver socket on the other of said truss member and support bar;
      2. one of the trunion member and socket on said truss member being intermediate the ends thereof;
      3. the one of the trunion member and socket on said support bar being spaced from said means for receiving and supporting the other end of said truss member;
      4. said socket receiving said trunion member to permit relative pivotal movement between said support bar and said truss member;
      5. cooperating load supporting surface on the support bar and truss member around the respective trunion member and socket;
   f. means on said support bar for receiving and supporting the other end of said truss member for distributing a load on the trailer tongue member to the towing vehicle and to the towed vehicle in response to movement of said truss member about said fulcrum means.
   g. said truss member has a slide member mounted on the other end thereof;
   h. said means for receiving and supporting the other end of said truss member comprises an arcuate member mounted on said support bar and positioned te receive said slide member to movably support the other end of said truss member;

i. said linkage means has portion thereof movable between a locking position and a release position;

j. said truss member comprises a pair of arms spaced apart at the one end thereof and converging toward the other end thereof;

k. said linkage means includes a pair of spaced first links each having one end thereof secured to said shaft and extending therefrom and a pair of spaced second links each having one end thereof pivotally mounted on the other end of a respective first link and the other end thereof pivotally mounted on respective arms of said truss member adjacent the one end thereof;

l. said shaft has a pair of abutment members mounted thereon and positioned to engage said respective second links when in the locking position for resisting lateral movement thereof.

7. A load and sway control structure for use between a towed vehicle and a towing vehicle, said towed vehicle having a trailer tongue member having a connection member thereon, said load distribution structure comprising:

a. a support bar mounted on a towing vehicle and having means thereon for receiving and supporting a connection member on the trailer tongue member;

b. an elongated truss member spaced from the trailer tongue member;

c. an elongated shaft rotatably supported relative to a trailer tongue member of a towed vehicle;

d. linkage means connected to and extending between said shaft and one end of said truss member for effecting relative movement therebetween;

e. fulcrum means on said truss member and said support bar to effect movement of the other end of said truss member toward and away from said support bar in response to adjustment of said linkage means;

f. means on said support bar for receiving and supporting the other end of said truss member for distributing a load on the trailer tongue member to the towing vehicle and to the towed vehicle in response to movement of said truss member about said fulcrum means;

g. said shaft is positioned above and extends transversely of the trailer tongue member;

h. said truss member is positioned below and extends generally parallel with the trailer tongue member;

i. said truss member comprises a pair of arms spaced apart at the one end thereof and converging toward the other end thereof;

j. said linkage means includes a pair of spaced first links each having one end thereof secured to said shaft and extending therefrom and a pair of spaced second links each having one end pivotally mounted on the other end of a respective first link and the other end thereof pivotally mounted on a respective arm of said truss member adjacent the one end thereof;

k. said second links have one portion thereof movable between a locking position and a release position; and l. said shaft has a pair of abutment members mounted thereon and positioned to engage said respective second links when in the locking position to resist lateral movement thereof.

8. A load and sway control structure for use between a towed vehicle and a towing vehicle, said towed vehicle having a trailer tongue member having a connection member thereon, said load distribution structure comprising:

a. a support bar mounted on a towing vehicle and having means thereon for receiving and supporting a connection member on the trailer tongue member;

b. an elongated truss member spaced from the trailer tongue member;

c. an elongated shaft rotatably supported relative to a trailer tongue member of a towed vehicle;

d. linkage means connected to and extending between said shaft and one end of said truss member for effecting relative movement therebetween;

e. fulcrum means on said truss member and said support bar to effect movement of the other end of said truss member toward and away from said support bar in response to adjustment of said linkage means;

f. means on said support bar for receiving and supporting the other end of said truss member for distributing a load on the trailer tongue member to the towing vehicle and to the towed vehicle in response to movement of said truss member about said fulcrum means; and g. means on the support of said shaft and said linkage means retaining said one end of the truss member against lateral movement relative to said tongue.

* * * * *